INVENTOR.
Paul D. Agarwal

Nov. 4, 1969    P. D. AGARWAL    3,476,999
MOTOR POWER SUPPLY SYSTEM
Filed Dec. 30, 1966    2 Sheets-Sheet 2

INVENTOR.
Paul D. Agarwal
BY
C.R. Meland
His Attorney

United States Patent Office 3,476,999
Patented Nov. 4, 1969

3,476,999
MOTOR POWER SUPPLY SYSTEM
Paul D. Agarwal, Santa Barbara, Calif., assignor to General Motors Corporation, Detroit, Mich., a corporation of Delaware
Filed Dec. 30, 1966, Ser. No. 606,395
Int. Cl. H02p 5/20, 5/22
U.S. Cl. 318—146               9 Claims

ABSTRACT OF THE DISCLOSURE

A power supply system for an induction motor where the motor is directly connected with a generator driven by a variable speed prime mover. The generator is of a type which has an output voltage the frequency of which is independent of prime mover speed. The field of the generator is excited by an electrical system which provides a signal current to the field which has a frequency that is a summation of actual motor speed and a desired slip frequency. With this arrangement the slip frequency of the induction motor is controlled and due to the direct connection of the generator and motor the voltage applied to the induction motor is the same as the frequency of the output voltage of the generator.

---

This invention relates to a motor power supply system for an induction motor that is capable of maintaining a constant but adjustable slip over the varying speed range of the induction motor.

One method of obtaining a constant but adjustable slip induction motor power supply system is to use a solid state inverter which may be comprised of controlled rectifiers, transistors or the like to feed the induction motor. One system of this type is shown in co-pending U.S. Patent application, Ser. No. 295,954, filed in the name of Paul D. Agarwal, et al., on July 18, 1963, now U.S. Patent 3,323,032 and assigned to the assignee of this invention.

In contrast to a system which uses a solid state inverter to feed the induction motor, it is an object of this invention to provide a constant slip motor power supply system for an induction motor where the induction motor can be fed directly from a generator which is driven by a prime mover such as an engine. This arrangement is particularly desirable where one or more induction motors are used to propel a vehicle since the induction motor eliminates commutator problems and provides extremely high torque capabilities at stall and low speeds.

The present invention is concerned with providing a generator which has an output frequency that is independent of the speed of the prime mover which drives the generator. The generator is electrically connectd to an induction motor and a device which provides a signal that is a function of induction motor speed is utilized. The speed signal of the induction motor is added to a slip frequency signal provided by some device such as an oscillator and the sum of motor speed and the frequency of the slip frequency signal is applied to the generator such that the output frequency of the generator is independent of prime mover speed but is dependent upon induction motor speed added to a slip frequency signal having an adjustable frequency.

With the arrangement that has just been described, the frequency of the voltage applied to the motor varies as motor speed varies but the slip frequency of the induction motor is maintained substantially constant. The slip frequency of the motor can be adjusted by adjusting the frequency of the slip frequency signal that is added to the motor speed signal.

One of the objects of this invention is to provide a motor control system wherein an induction motor is electrically connected to a generator and where the frequency of the current applied to the induction motor from the generator is a function of motor speed added to a slip frequency but independent of the speed of rotation of the prime mover that drives the generator.

Another object of this invention is to provide an electric motor power supply system for a vehicle that uses squirrel cage induction type motors and to provide a system where the motors have a constant but adjustable slip frequency.

Further objects and advantages of the present invention will be apparent from the following description, reference being had to the accompanying drawings wherein preferred embodiments of the present invention are clearly shown.

IN THE DRAWINGS

Figure 1:
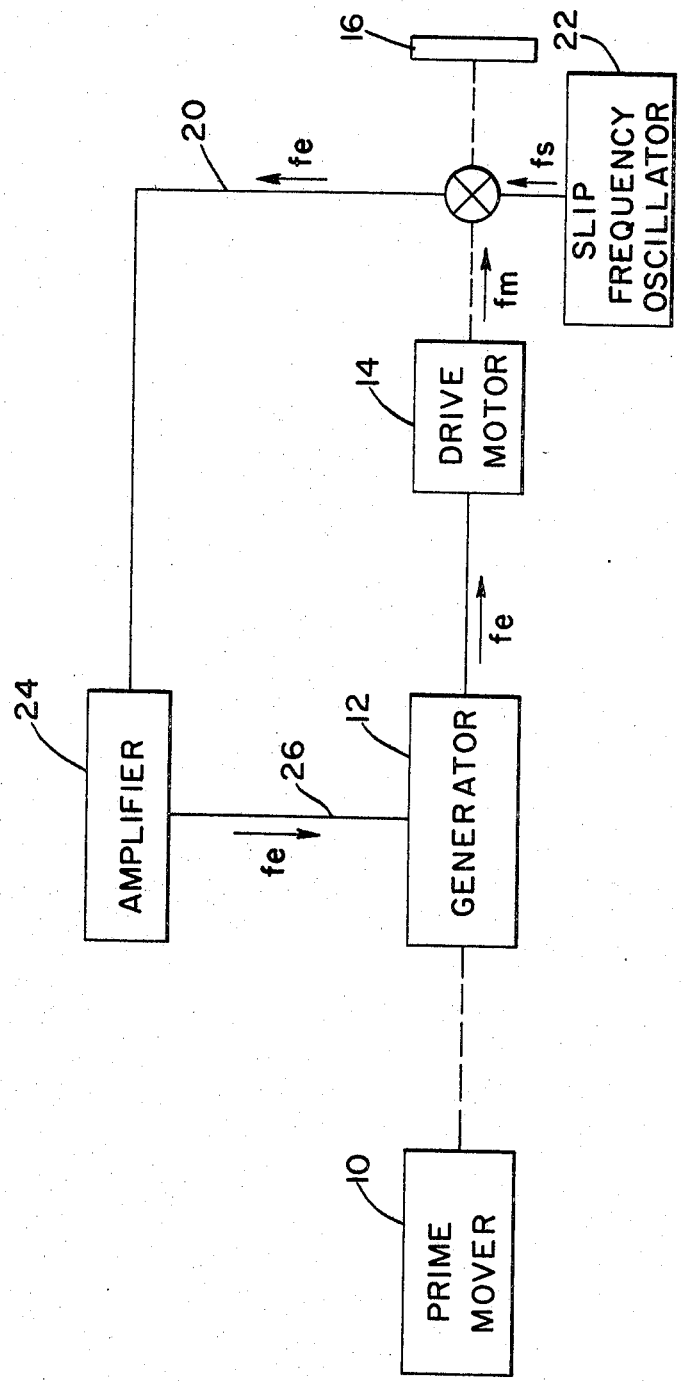
FIGURE 1 is a schematic block diagram illustration of a motor power supply system made in accordance with this invention.

Referring now to the drawings and more particularly to FIGURE 1, the reference numeral 10 designates a prime mover which may be, for example, an internal combustion or diesel engine or a turbine where the motor control system of this invention is used to propel a motor vehicle. The motor control system is not limited to vehicle use although it has a number of advantages for this use since it employs induction motors as the source of power for driving the load such as the wheels on a motor vehicle.

The prime mover 10 is mechanically coupled to a generator 12 that may take various forms as is more fully described hereinafter. The generator 12 must be of a type, however, wherein the output frequency of the generator is independent of the speed of rotation of the rotatable element of the generator and the speed of rotation of the prime mover 10. In other words, the generator 12 must devolop an output voltage the frequency of which does not vary as prime mover speed varies.

The generator 12 is electricaly connected to an induction motor 14 which drives a load 16 which in this case is illustrated as a wheel on a motor vehicle. The induction motor is of the type that does not require brushes and preferably is of the squirrel cage type.

The induction motor 14 in addition to driving the wheel or load 16 is mechanically coupled to a frequency transducer generally designated by reference numeral 18. The frequency transducer must be capable of providing an output signal $f_e$ on line 20 which is a function of the motor speed of motor 14 and a frequency supplied to the transducer 18 by a slip frequency oscillator 22 having an adjustable and variable output frequency. If the frequency corresponding to the output speed of the motor 14 is designated as $f_m$ and the output frequency of the slip frequency oscillator is designated as $f_s$, the output of the frequency transducer 18 will be $f_s+f_m$. In other words, the frequency $f_e$ which is applied to line 20 equals $f_s+f_m$ so that a signal is provided on line 20 which is a function of motor speed added to the output frequency of the slip frequency oscillator.

The frequency transducer 18 can take a wide variety of forms as long as an output signal $f_e$ is developed by this device which is a function of motor shaft speed added to the frequency of the slip frequency oscillator 22. By way of example and not by way of limitation, one arrangement that can be employed to provide this signal is an electromagnetic differential of the type disclosed in the above-mentioned co-pending patent application, Ser. No. 295,954, filed on July 18, 1963 and now U.S. Patent 3,-323,032. Thus, two phase power of a slip frequency $f_s$ coming from the slip frequency oscillator 22 can be fed into a two phase generator rotor mounted on the shaft of the motor 14. The stator of this generator will then have an output frequency of $f_e$. The slip frequency power can be fed through two rotating transformers thus eliminating all rotating contacts in the motor or through slip rings. Since the slip power required is less than a watt, the slip rings could be instrument type and would provide no problems as far as maintenance and reliability are concerned.

The signal $f_e$ is applied to an amplifier 24 which can be an electronic or rotating amplifier. The output of the amplifier 24 is applied to the excitation winding of the generator 12 by line 26. With the arrangement just described, the output frequency of the generator 12 will be $f_e$ since this frequency is independent of prime mover speed and depends upon the signal developed by the frequency transducer 18.

Figure 2:
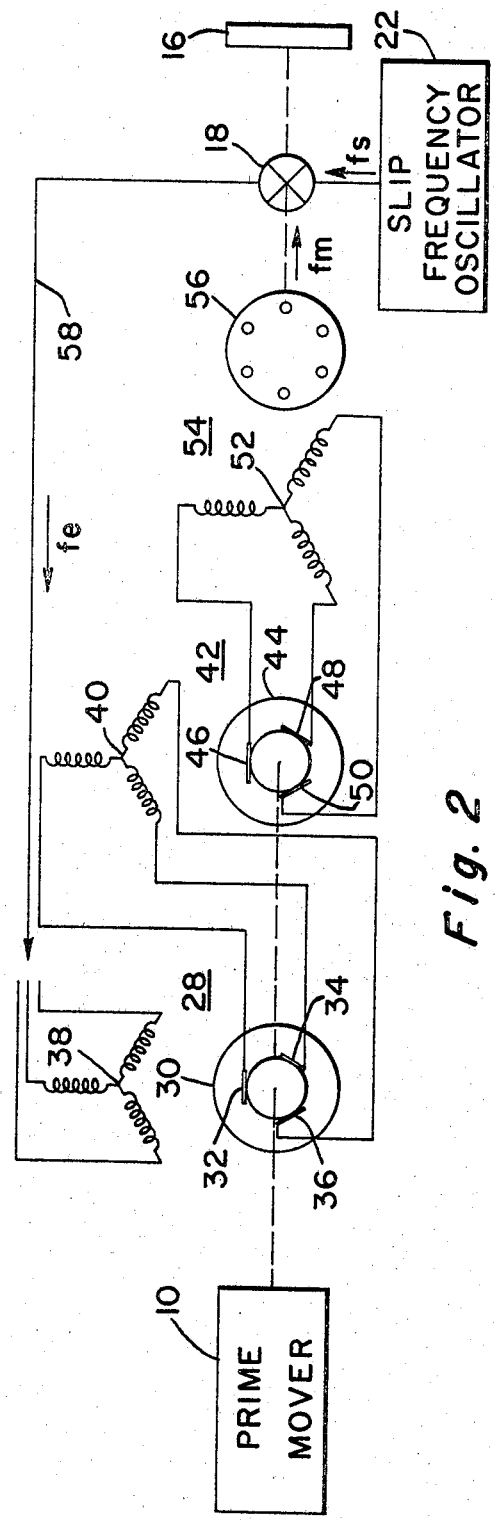
FIGURE 2 is a schematic diagram of a motor power supply system made in accordance with this invention where the generator has a polyphase stator winding and a rotor provided with a commutator and brushes.

Referring now to FIGURE 2, a specific embodiment of the invention is illustrated. In FIGURE 2, the prime mover again is designated by reference numeral 10 and the amplifier takes the form of an exciter generator designated by reference numeral 28. The exciter 28 has a rotor 30 which is a conventional direct current armature having a commutator connected with an armature winding which engages the brushes 32, 34 and 36. The exciter 28 has a stationary polyphase winding 38 and the rotor 30 in the actual physical layout of the machine rotates within the fixed stationary winding which can be wound on a cylindrical stator core.

The brushes 32, 34 and 36 on the commutator are placed 360/M electrical degrees apart for an M phase machine. In the embodiment illustrated which employs a three phase Y-connected stator winding, the brushes will be located 120 electrical degrees apart.

When the stator winding 38 of the exciter is energized by a polyphase voltage, this excitation power generates a rotating magnetic field in the stator winding whose speed is determined by the frequency of the applied voltage. In FIGURE 2, the frequency of the applied voltage is again designated as $f_e$ and a rotating field is therefore developed in the stationary winding of a frequency $f_e$. The voltage developed at the brushes 32, 34 and 36 will be a polyphase voltage whose frequency is also $f_e$ regardless of the speed of rotation of the rotor 30 which is driven by the prime mover.

It is seen in FIGURE 2 that the output voltage of the exciter 28 is applied to the stator winding 40 of a main power generator designated by reference numeral 42. The generator 42 is of the same type as the exciter generator 28 in that it has a conventional commutator type of direct current armature 44 that rotates within the polyphase stationary winding 40. The brushes 46, 48 and 50 that engage the commutator of the rotor 44 again are spaced 360/M electrical degrees apart for an M phase machine. The output voltage of the main generator 42 is applied to a polyphase winding 52 of an induction motor 54. The induction motor has a squirrel cage rotor 56 which is mechanically coupled to the frequency transducer 18 and to the wheel 16.

The current having an output frequency $f_e$ of the frequency transducer 18 is applied to the stationary winding 38 of the exciter via line 58. Since the frequency $f_e$ is applied to the stationary winding 38, the output voltage of the exciter will have a frequency $f_e$. This voltage is then applied to the stationary winding 40 of the main generator 42 and the output voltage of this machine will therefore have a frequency $f_e$. It therefore will be appreciated that the frequency of the voltage applied to the induction motor 54 will at all times have a frequency $f_e$ and that this frequency will be a function of the speed of rotation of the squirrel cage rotor 56 added to the frequency of the slip frequency oscillator 22. The net result of this arrangement is that the induction motor 54 will have a constant slip frequency which is adjustable by adjusting the output frequency of the slip frequency oscillator 22. It will, of course, be appreciated that the frequency $f_e$ will vary continuously as motor speed varies but that the slip frequency of the induction motor will remain substantially fixed. The speed of the motor can be varied by varying the output voltage of generator 42 and by adjusting the slip of the motor. Slip adjustmen is achieved by varying the frequency of the slip frequency oscillator 22.

In the arrangement of FIGURE 2, the power amplification factor of the generator 42 will be about 30 to 40 and the excitation power required for the generator 42 is only about 2% to 3% of the rated horsepower of this generator. As pointed out previously, the generator excitation power for generator 42 could be supplied by an electronic amplifier or by the exciter 28. Where an exciter is used, it preferably is mounted on the same shaft as the main generator 42 and has a rating of about 2% to 3% of the main generator and therefore could be a relatively small machine. The power output of the frequency transducer 18 need only be less than about 1% of the main generator rating.

Figure 3:
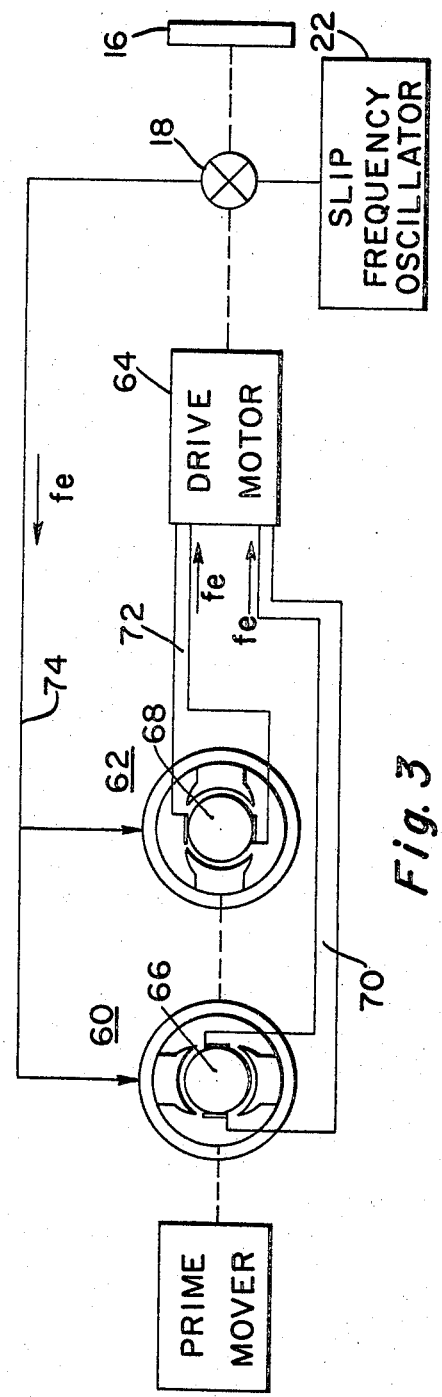
FIGURE 3 is a schematic circuit diagram of a motor control system made in accordance with this invention where the motor is a two phase motor that is supplied by two generators driven by a prime mover.

Referring now to FIGURE 3, a modified motor power supply system is illustrated where the frequency of the voltage applied to the motor again is a function of motor speed added to a slip frequency. In FIGURE 3, two generators 60 and 62 are provided which have half the power rating of the generator 42 illustrated in FIGURE 2.

In FIGURE 3, the drive motor 64 is a two-phase motor and it has a shaft mechanically coupled to the frequency transducer 18 and to the wheel 16. The generators 60 and 62 have rotors 66 and 68 which are conventional rotors for direct current machines in that they have a winding located on a core which is connected with a commutator. The commutator for rotor 66 engages brushes connected with conductors 70 while the commutator of rotor 68 engages brushes connected with conductors 72. The stationary windings of generators 60 and 62 can be salient pole or cylindrical. The two machines can be integrated into one machine utilizing the same frame and the output voltage of the two machines is two phase power supplied respectively by conductors 70 and 72 which are connected with the two phase winding of the motor 64. The output voltage of the frequency transducer 18 is fed to the stationary windings of the generators 60 and 62 via a line 74. For convenience of illustration, only one line 74 generators 60 and 62 but each stationary winding is excited by one phase of the two phase signal provided by the frequency transducer 18.

The generators 60 and 62 are therefore supplied with a voltage from frequency transducer 18 which has a frequency $f_e$ with one phase of the two phase signal being supplied respectively to each of the generators.

In the system of FIGURE 3, the frequency of the voltage applied to the two phase motor 64 will be $f_e$ since the output voltage of the generators 60 and 62 will be independent of rotor speed but will depend on the signal voltage coming from the frequency transducer 18.

The power supply system of this invention has definite advantages as compared with DC to DC electric power supply systems. One of the advantages is the fact that it replaces the DC traction motor by a squirrel cage induction type motor which is much lighter and more rugged and therefore eliminates the normal mode of failure of DC traction motors which is commutator flashover caused by heavy overloads. When compared with the inverter system disclosed in the above-mentioned co-pending patent application, Ser. No. 295,954, and now Patent 3,323,032, the present system eliminates the need of high power silicon controlled rectifiers and electric drive systems of any power rating can be readily fabricated.

Another advantage of the system disclosed in this invention is that the generator is directly connected to the traction motor without any intervening solid state devices and therefore the problem of power reversal is simplified.

While the embodiments of the present invention as herein disclosed constitute a preferred form, it is to be understood that other forms might be adopted.

What is claimed is as follows:

1. A motor power supply system comprising, a variable speed prime mover, an electromagnetic generating means, said generating means having a rotor mechanically coupled to said prime mover, said generating means further including an input winding and an output winding one of which is carried by said rotor, said generating means being so constructed and arranged that an alternating voltage is generated in said output winding when said rotor is driven by said prime mover having a frequency which is the same as the frequency of an alternating excitation voltage applied to said input winding but independent of prime mover speed, an induction drive motor having an input winding and a squirrel cage rotor, conductor means electrically conecting said output winding of said generating means and said input winding of said induction motor whereby the frequency of the current applied to said induction motor is the same as the output frequency of said output winding of said generating means, means for providing a first signal indicative of a desired slip frequency for said motor, means coupled to the rotor of said induction motor for providing a second signal which is a function of the speed of rotation of the rotor of said induction motor, means for adding said first and second signals to provide a third signal which is a function of induction motor speed and slip frequency, and means for applying an alternating current to said input winding of said generating means which has a frequency that is determined by said third signal whereby the output frequency of said generating means is the same as the frequency of the alternating current exciting said input winding and is a function of actual motor speed and slip frequency but independent of prime mover speed.

2. The electrical system according to claim 1 where the generating means comprises two generators that provide two phase output power to the motor.

3. A traction motor power supply system comprising, an electromagnetic generating means having a stationary winding and a rotatable winding one of which forms a field winding for said machine and the other of which forms an output winding for the machine, means for driving said rotatable winding, an induction type traction motor, means electrically connecting the output winding of said generating means with said motor whereby the frequency of the current applied to said motor from said output winding is the same as the frequency of the output current of said generating means, for providing a first signal having a predetermined frequency which is indicative of a desired slip frequency for said motor, means for providing a second signal the frequency of which is a function of drive motor speed, means for providing a third signal which is a summation of said first and second signals and means for applying said third signal to said field winding of said generating means, said generating means including means for generating an output voltage the frequency of which is independent of the speed of said rotatable winding but a function of the frequency of said third signal.

4. The electrical system according to claim 3 where the generating means comprises a dynamoelectric machine having a polyphase stationary winding and a direct current type of armature having a commutator and a winding.

5. The electrical system according to claim 3 where the electric drive motor is mechanically coupled to a wheel of a vehicle to propel said vehicle.

6. The electrical system according to claim 3 where the generating means is excited from an exciter having a rotor and stator.

7. The electrical system according to claim 1 where the generating means comprises a generator having a polyphase stationary winding and a commutator type of rotor and where brushes are provided which engage the commutator that are displaced 360/M electrical degrees for an M phase machine and wherein said brushes are conected with said motor input winding.

8. The electrical system according to claim 1 where the input winding of said generating means is electrically connected with an output winding of a rotatable exciter driven by said prime mover, the input winding of said exciter having an alternating current applied thereto which is a function of said third signal and wherein the input and output frequencies of the exciter are equal and independent of prime mover speed.

9. The electrical system according to claim 1 where said first signal which is indicative of a desired slip frequency is adjustable.

References Cited

UNITED STATES PATENTS

| 2,629,075 | 2/1953 | Deschmann | 318—147 |
| 783,708 | 2/1905 | Stanley | 322—61 |
| 3,372,323 | 3/1968 | Guyeska | 318—231 |

ORIS L. RADER, Primary Examiner

K. L. CROSSON, Assistant Examiner

U.S. Cl. X.R.

318—231; 322—32

PO-1050
(5/69)

UNITED STATES PATENT OFFICE
CERTIFICATE OF CORRECTION

Patent No. 3,476,999          Dated November 4, 1969

Inventor(s)          Paul D. Agarwal

It is certified that error appears in the above-identified patent and that said Letters Patent are hereby corrected as shown below:

Column 1, line 55, "connectd" should read -- connected --;
Column 4, line 13, "adjustmen" should read -- adjustment --;
Column 4, lines 51, 52, 53, 54 and 55, after "74." delete the entire last sentence and insert -- For convenience of illustration, only one line 74 has been illustrated for each stationary winding of the generators 60 and 62 but each stationary winding is excited by one phase of the two phase signal provided by the frequency transducer 18. --.
Column 6, line 2, after "means," insert -- means --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents